May 9, 1967

B. H. PINCKAERS 3,319,152

SCR SWITCHING CIRCUIT

Filed Dec. 19, 1963

INVENTOR.
BALTHASAR H. PINCKAERS
BY
Omund R. Dahle
ATTORNEY

United States Patent Office 3,319,152
Patented May 9, 1967

3,319,152
SCR SWITCHING CIRCUIT
Balthasar H. Pinckaers, Edina, Minn., assignor to Honeywell Inc., a corporation of Delaware
Filed Dec. 19, 1963, Ser. No. 331,747
5 Claims. (Cl. 323—22)

This invention involves an improvement in a solid state full wave A.C. switch utilizing controlled rectifiers. The invention is especially directed to apparatus in which the switching of the controlled rectifiers is accomplished at or near zero degrees in the cycle of the A.C. power supply to eliminate noise and radio frequency interference which is often generated by the turn-on of controlled rectifiers at later portions of the cycle. This invention is further directed to accomplishing proportional control to a load device by allowing the controlled rectifiers to be "on" for a number of cycles of the power source and then to be maintained "off" for a predetermined number of cycles, the ratio of the "on" and "off" periods to be determined by the magnitude of the input signal.

It is an object of this invention to provide an improved controlled rectifier switching circuit in which the switching of the controlled rectifiers is accomplished at or near zero degrees in the power line cycle.

It is a further object of this invention to provide controlled rectifiers switching apparatus in which proportional control to a load is accomplished by allowing the controlled rectifiers to conduct through a number of complete cycles of the A.C. power source and then to maintain the controlled rectifiers nonconductive for a predetermined number of cycles.

These and other objects of the invention will become more apparent upon a consideration of the specification, claims, and drawings of which:

Figures 1, 2:
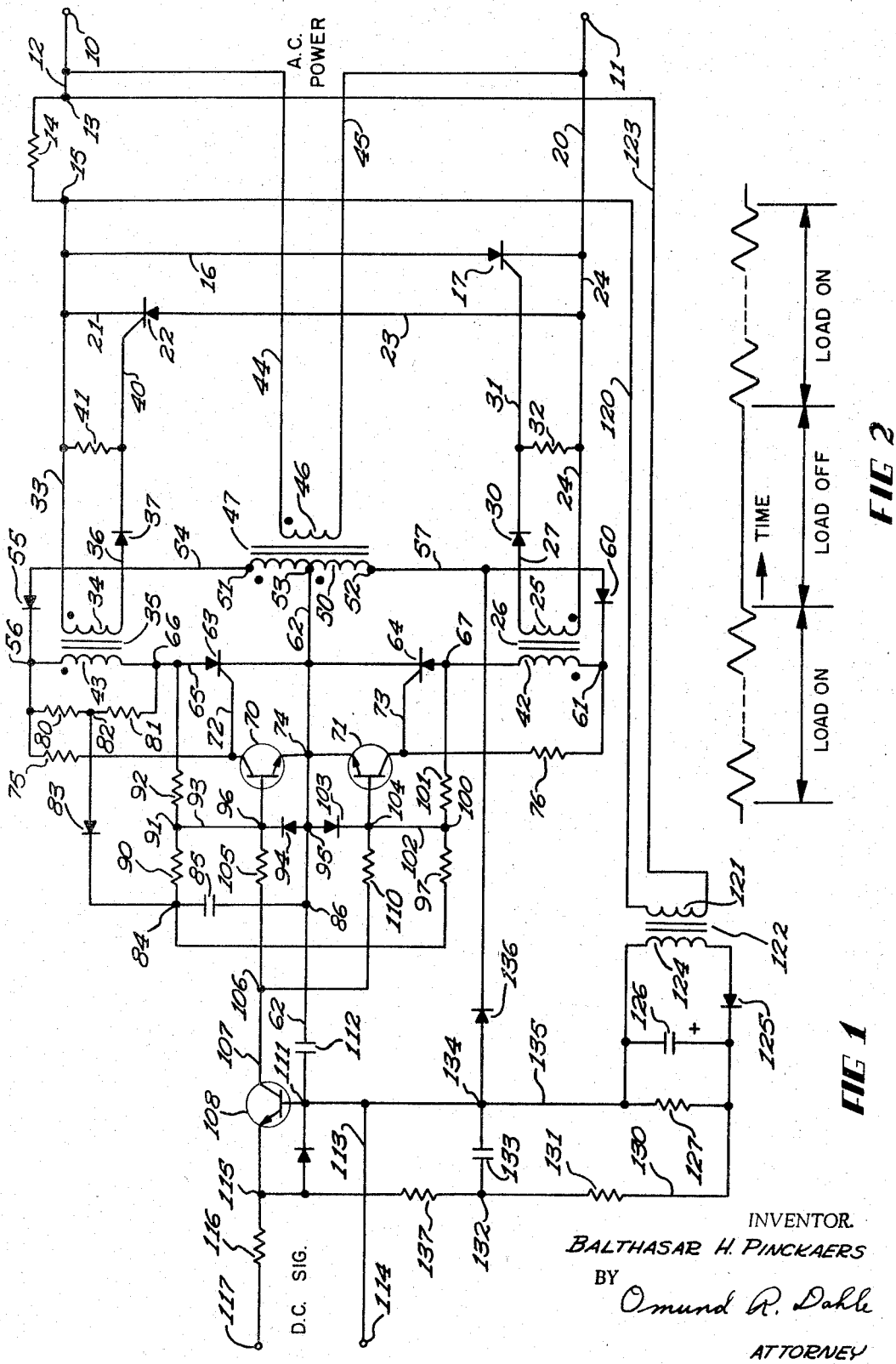
FIGURE 1 is a schematic diagram of an embodiment of the invention.
FIGURE 2 is a graphical representation of the A.C. power to the load during the modulating or proportioning operation of the invention.

Turning now to FIGURE 1, there is disclosed a pair of power input terminals 10 and 11 which are adapted to be connected to a source of alternating current potential. The alternating current applied need not be limited to a sine wave shape. The input terminal 10 is connected through a conductor 12 to a first terminal 13 of a load device 14. The load device is herein shown as being of a resistive type, such as an electric heating element, for example, although the load is not necessarily intended to be limited to a resistive type load. An opposite terminal 15 of the load device 14 is connected by a conductor 16 to the anode of a controlled rectifier 17, here disclosed as a silicon controlled rectifier (SCR). The cathode of SCR 17 is connected by a conductor 20 to the power input terminal 11. A further circuit can be traced from the load terminal 15 and through a conductor 21 to the cathode of a second controlled rectifier 22, which preferably is identical to the controlled rectifier 17. The anode of SCR 22 is connected by conductors 23 and 20 to the power input terminal 11. The SCR's 17 and 22 also each include a gate electrode in addition to the anode and cathode electrodes.

A controlled circuit for the SCR 17 is connected between its gate and cathode electrodes and a circuit may be traced from the cathode through a conductor 24, a secondary winding 25 of a pulse transformer 26, a conductor 27, a rectifying diode 30, and a conductor 31 to the gate electrode of SCR 17. A resistor 32 is connected between the conductor 31 and the conductor 24 to provide a bleeder resistor from the gate electrode to the cathode and prevent any unwanted triggering of the SCR. A similar triggering circuit exists for SCR 22 and may be traced from the cathode through a conductor 33, a secondary winding 34 of a pulse transformer 35, a conductor 36, a rectifying diode 37, and a conductor 40 to the gate electrode of SCR 22. A resistor 41 is connected between the gate electrode and the cathode of SCR 22. The pulse transformer 26 has a primary winding 42 and the pulse transformer 35 has a primary winding 43.

The A.C. supply terminals 10 and 11 are also connected by means of conductors 44 and 45 to opposite extremities of a primary winding 46 of a power transformer 47. The transformer 47 includes a center tapped secondary winding 50 having terminal connections 51 and 52 at the extremity of the winding and having a center tap connection 53. The terminal 51 is connected by means of a conductor 54 and a rectifying diode 55 to the upper terminal 56 of the primary winding 43 of the transformer 35. The terminal 52 of winding 50 is connected by means of a conductor 57 and a rectifying diode 60 to the terminal 61 of the primary winding 42 of transformer 26. The center tap connection 53 is connected by means of a conductor 62 to the cathodes of a pair of small SCR's 63 and 64. The anode of SCR 63 is connected by a conductor 65 to the opposite terminal 66 of winding 43; likewise, the anode of SCR 64 is connected to a terminal 67 of the winding 42.

A pair of transistors 70 and 71, here shown as being of the NPN type, are connected in the control circuit of the SCR's 63 and 64. Thus, the gate electrode of SCR 63 is directly connected by a conductor 72 to the collector electrode of the transistor 70. Similarly, the gate electrode of SCR 64 is directly connected by a conductor 73 to the collector electrode of transistor 71. The emitter electrodes of transistors 70 and 71 are directly connected together at a junction 74 on the conductor 62. The collector electrode of transistor 70 is also connected by means of a collector load resistor 75 to the junction 56. Likewise, the collector electrode of transistor 71 is connected by means of a collector load resistor 76 to the junction 61. The transistors 71 and 70 thus receive their rectified half-wave supply voltages from the secondary winding of transformer 47 through the diodes 55 and 60, respectively. A voltage divider comprising resistive elements 80 and 81 is connected in parallel with the primary winding 43 of transformer 35. A junction 82 between the two resistive elements is connected through a rectifying diode 83, a junction 84, and a capacitor 85 to a junction 86 on the conductor 62.

A D.C. bias circuit for the transistor 70 may be traced from the junction 84 through a resistor 90, a junction 91, and conductor 93 to the base electrode of transistor 70. Junction 91, which is directly connected by a conductor 93 to the base electrode of transistor 70, is also connected through resistor 92 to the anode of SCR 63 at conductor 65. A rectifying diode 94 is connected between a junction 95 on the conductor 62 and a junction 96 on the conductor 93. A similar D.C. bias circuit for transistor 71 may be traced from the junction 84 through a resistor 97, a junction 100, and a resistor 101 to the anode of SCR 64 at conductor 67. The junction 100 is directly connected by a conductor 102 to the base electrode of transistor 71. A rectifying diode 103 is connected from the junction 95 to junction 104 on the conductor 102.

A control circuit for the transistors 70 and 71 may be traced from the junction 96 through a resistor 105, a junction 106, and a conductor 107 to the collector electrode of an NPN transistor 108. A further portion of this circuit may be traced from the junction 104 through a resistor 110 to the junction 106. The transistor 108 also includes an emitter electrode and a base electrode, the base electrode being connected by a junction 111 and a capacitor 112 to the conductor 62. The junction 111 is also connected by a conductor 113 to a signal input terminal 114. The emitter electrode of transistor 108 is connected by a junction 115 and a resistor 116 to the other D.C. signal input terminal 117.

The D.C. input signal is modified by a feedback signal which responds to the energization of the load device 14. Thus, a feedback circuit may be traced from the junction 15 through a conductor 120, the primary winding 121 of an isolation transformer 122, and a conductor 123 back to the load terminal 13. The transformer 122 also includes a secondary winding 124, the lower terminal of which is connected through a rectifying diode 125 and a filter capacitor 126 to the upper terminal of the winding 124. A resistor 127 is connected in parallel with the capacitor 126. The rectifying diode 125 is also connected by means of a conductor 130, a resistor 131, a junction 132, a capacitor 133, a junction 134, and a conductor 135 to the upper terminal of winding 124. A rectifying diode 136 interconnects the junction 134 with the conductor 57. The junction 134 is further directly connected to the base electrode of transistor 108. The junction 132 is further connected by a resistor 137 to the junction 115 and thus to the emitter of transistor 108.

In considering the operation of the circuit, the transistors 70 and 71 are normally conductive due to the bias currents applied thereto. It will be noted that the A.C. potential on winding 50 is rectified by diode 55 and flows though voltage divider 80 and diode 83 to charge the capacitor 85. The relatively large voltage on capacitor 85 then provides a D.C. bias current from the upper terminal of the capacitor at junction 84 and through the resistor 90, junction 91, conductor 93, and from base to emitter of transistor 70. A similar bias path exists for transistor 71 and may be traced from the upper plate of capacitor 85 through junction 84, resistor 97, conductor 102, and from base to emitter of transistor 71. In addition to the D.C. bias, a further half-wave bias for the transistor 70 may be traced from the winding 50 through rectifier 55, primary winding 43, conductor 65, resistor 92, conductor 93, and from base to emitter of transistor 70. A similar pulsating bias is applied to transistor 71 and may be traced from the lower terminal of secondary winding 50 through rectifier 60, winding 42, conductor 67, resistor 101, conductor 102, and from base to emitter of transistor 71. These two bias currents for each of the transistors 70 and 71 maintains them fully conductive which, in effect, shorts out the gating electrode of the SCR's 63 and 64 so that no gating pulses can be applied to these SCR's. The SCR's 63 and 64 are maintained nonconductive.

Let us now assume an increase in the signal at terminals 114 and 117 with terminal 114 being rendered more positive with respect to terminal 117. It can be seen that a signal current will be caused to flow from base to emitter of transistor 108 to render this transistor conductive.

The voltage across capacitor 112 is the collector voltage supply for common-base connected transistor 108. Capacitor 112 is charged to a D.C. voltage approximately equal to the peak value of the A.C. voltage present in secondary winding 50 of transformer 47. A charging path for capacitor 112 may be traced from center tap 53, conductor 62, capacitor 112, junctions 111 and 134, diode 136, conductor 57 to terminal 52 of winding 50. The right hand terminal of capacitor 112 is positive. Thus when, as assumed, the D.C. signal voltage applied through resistor 116 causes an increasing emitter current in transistor 108, there is a corresponding increase in collector current. There are two paths though which this collector current of transistor 108 flows. The collector current flows from the right hand terminal of capacitor 112, through junctions 86, 95 to junction 74 where it divides. One part flows from junction 74 through the forward biased emitter-base junction of transistor 70, junction 96, resistor 105 to junction 106 and the other part through a similar path from junction 74, through transistor 71, junction 104, resistor 110 to junction 106. From junction 106 the combined current flows through conductor 107, collector-base circuit of transistor 108, and junction 111 to the left hand (negative) terminal of capacitor 112. The resistors 105 and 110 may, for example, have equal resistances so that approximately half of the collector current of transistor 108 flows through the emitter-base circuit of each of transistors 70 and 71. Transistor 70 and SCR 63 and also transistor 71 and SCR 64 are included in a switching circuit similar to that described in my Patent 3,065,388 which is assigned to the same assignee as the present invention. This type of switching circuit will switch its load "on" when the D.C. input current, which in this case is a certain portion of the collector current of transistor 108, is about equal to the D.C. forward bias current of the transistors 70 and 71. The D.C. bias currents of transistors 70 and 71, governed by resistors 90 and 97 respectively, and the values of resistors 105 and 110 are adjusted such that when the collector current of transistor 108 increases to a certain value the upper switching circuit comprising SCR 63 turns on first, and subsequently the lower switching circuit will also turn "on" near the beginning of the next half-cycle of the A.C. supply. Once both switching circuits turn "on" during their respective half-cycles, the input current and therefore the collector current of transistor 108 can actually decrease by a certain amount before both switching circuits will no longer turn on during their respective half-cycles.

In other words, when the collector current of transistor 108 or the D.C. input (signal) current reaches a certain value, both the upper and lower switching circuits turn on during their respective half-cycles.

When junction 51 is positive with respect to center tap 53, the upper switching circuit turns "on," i.e. SCR 63 turns on, and energizes winding 43 of transformer 35. As may be seen from the polarity dots on the drawing, this occurs when line terminal 10 goes positive with respect to line terminal 11. It can also be seen that SCR 22 cannot conduct because its cathode is positive with respect to its anode. However, when the half-cycle ends during which the upper switching circuit was on, and SCR 63 becomes nonconductive, the inductive energy stored in transformer 35 causes a current to flow from lower terminal of secondary winding 34, through diode 36, conductor 40, gate-cathode circuit of SCR 22 and conductor 33 to the upper terminal of winding 34. It should be noted that when this occurs, the A.C. line polarity has also reversed and terminal 11 is now becoming positive with respect to terminal 10. Therefore, the anode of SCR 22 is becoming positive (proper polarity for firing SCR) when the above described gate current is already existing. Therefore, SCR 22 fires when the A.C. supply begins a new half-cycle and the voltage at terminals 10 and 11 starts to increase from zero. Clearly then the upper switching circuit (which controls SCR 22) does not turn "on" SCR 22 when it itself is "on" but does so at the beginning of the next half-cycle when it itself is "off."

The same operation occurs for the other SCR 17 which is controlled by the lower switching circuit.

As discussed above, during the period when the SCR's 63 and 64 are "off," substantially no voltage appears across the winding 43 and thus the charge on capacitor 85 approaches the peak voltage on winding 50. Upon the firing of SCR 63, the majority of the voltage induced on winding 50 appears across the winding 43 and also across voltage divider 80 and 81. The charging potential for capacitor 85 will be reduced as a function of the relative values of resistors 80 and 81 so that a smaller bias potential will be available from capacitor 85 to maintain conductive the transistors 70 and 71. As a result of the reduced D.C. bias current, it is obvious that less signal current will be required at terminals 114 and 117 to turn transistor 70 off and thus a predetermined differential is incorporated into the circuit. This is to insure that once the D.C. input to terminals 114 and 117 has become large enough to cause the SCR's to fire on one cycle that they will continue to fire on the succeeding cycles as long as the same level of signal is applied.

Turning now to the negative feedback circuit connected across the load device, it can be seen that when the SCR's 22 and 17 are rendered conductive, full wave A.C. power is applied to the load. This A.C. potential is also applied to transformer 122, is rectified, and tends to charge capacitor 126. A further time delay circuit comprising the resistor 131 and capacitor 133 is connected to capacitor 126; capacitor 133 is subsequently charged subject to the voltage on capacitor 126 and applies a potential to the inposes the D.C. input signal at terminals 114 and 117. In other words, the feedback voltage is summed with the signal voltage and as the feedback voltage builds up, the total signal to transistor 108 is reduced to a value equivalent to the differential of the switching circuit, whereupon the SCR's 63 and 64 are no longer fired, the SCR's 22 and 17 are turned off, and the load is de-energized. The number of cycles of the A.C. power during which the SCR's are turned off is in part dependent upon the RC discharge time of the feedback network. When the feedback signal has discharged sufficiently, and assuming the D.C. input signal has remained unchanged, the SCR's will again be turned on for a number of cycles. The ratio of the on time to the "off" time is determined by the magnitude of the input signal to terminals 114 and 117. When the input signal is of sufficient magnitude, it will override the feedback signal and maintain the SCR's 22 and 17 constantly conductive.

As has been stated earlier, it is important to initiate conduction in SCR's 22 and 17 at or near the beginning of the power line cycle. With the SCR's being turned "on" as the A.C. voltage begins to build up from zero, the radio frequency interference and switching noise is reduced to a minimum. In prior systems in which modulation to the load is accomplished by switching the SCR's on during the cycle, switching noise becomes a significant problem. Thus the cooperaton of the SCR's 63 and 64 together with the inductive action of transformers 35 and 26 results in a turn-on signal to the SCR's 22 and 17 at or near the zero degree point in the power line cycle at which point the switching noises are a minimum.

Modifications of this invention may be apparent to those who are versed in the art and I therefore wish it to be understood that I intend it to be limited to the scope of the appended claims and not to the specific embodiment which is disclosed for the purpose of illustration only.

I claim as my invention:

1. Controlled rectifier switching apparatus comprising:
    (a) first and second power input terminals energized from a source of alternating current potential;
    (b) first and second controlled rectifier means, each having current carrying electrodes and a control electrode, said means having their current carrying electrodes connected in parallel one with the other but in polarity opposition;
    (c) means including said current carrying electrodes connecting load means to said alternating current potential input terminals, said first controlled rectifier being poled so that it may be rendered conductive during the first half cycles of said alternating current potential, said second controlled rectifier being poled so that it may be rendered conductive during the second half cycles of said alternating current potential;
    (d) third and fourth controlled rectifier means connected to be energized from said source of alternating current potential on said first and second half cycles, respectively, each of said means including current carrying electrodes and a control electrode;
    (e) signal delay means coupling said third and fourth controlled rectifiers current carrying electrodes to said control electrodes of said second and first controlled rectifier means;
    (f) and circuit means connecting the control electrodes of said third and fourth controlled rectifier to a signal source such that when said signal causes said third controlled rectifier to be conductive during a given first half cycle, said delay means couples a turn-on signal to said second controlled rectifier to render it conductive at the beginning of the succeeding second half cycle.

2. Controlled rectifier switching apparatus comprising:
    (a) first and second power input terminals energized from a source of alternating current potential;
    (b) first and second controlled rectifier means, each having an anode and a cathode comprising current carrying electrodes and a control electrode, said means having the anode of each means connected to the cathode of the other, the means thus being connected in parallel one with the other but in polarity opposition;
    (c) means comprising said current carrying electrodes connecting load means to said alternating current potential power input terminals, said first controlled rectifier being poled so that it may be rendered conductive during the first half cycles of said alternating current potential, said second controlled rectifier being poled so that it may be rendered conductive during the second half cycles of said alternating current potential;
    (d) third and fourth controlled rectifier means connected to be energized from said source of alternating current potential on alternate and opposite half cycles, respectively, each of said means including current carrying electrodes and a control electrode;
    (e) signal delay means comprising transformer means coupling said third and fourth controlled rectifiers current carrying electrodes to said control electrodes of said second and first controlled rectifier means;
    (f) and circuit means connecting the control electrodes of said third and fourth controlled rectifier to a signal source.

3. Controlled rectifier switching apparatus comprising:
    (a) first and second power input terminals energized from a source of alternating current power;
    (b) first and second controlled rectifiers, each having an anode and a cathode comprising current carrying electrodes and having a control electrode, said rectifiers having the anode of each connected to the cathode of the other, the rectifiers thus having their current carrying electrodes connected in parallel one with the other but in polarity opposition;
    (c) means comprising said current carrying electrodes of said controlled rectifiers connecting load means to said first and second alternating current power input terminals, said first controlled rectifier being poled so that it may be rendered conductive during the first half cycle of said alternating current power, said second controlled rectifier being poled so that it may be rendered conductive during the second half cycle of said alternating current power;
    (d) third and fourth controlled rectifiers each including current carrying electrodes and a control electrode and each connected to be energized by half wave power from said source of alternating current power, said third controlled rectifier being energized on the first half cycles of said alternating source and said fourth controlled rectifier being energized on the second half cycle of said alternating source;
    (e) first transformer time delay means coupling said third controlled rectifier current carrying electrodes to said control electrodes of said second controlled rectifier whereby a turn-on signal can be applied;
(f) second transformer time delay means coupling said fourth controlled rectifier current carrying electrodes to said control electrode of said first controlled rectifier;
(g) and circuit means connecting the control electrodes of said third and fourth controlled rectifier to a signal source, such that when the signal is sufficient said third controlled rectifier is caused to conduct during said first half cycles, respectively, and the output from said rectifier is coupled by said first transformer time delay means such that said second controlled rectifier is rendered conductive for the entire second half cycle.

4. Controlled rectifier switching apparatus for causing turn-on signals for the controlled rectifiers to be applied at the beginning of the half cycles of the alternating current supply so that the controlled rectifiers, when conductive, are conductive for the entire half cycle, comprising:
(a) first and second controlled rectifiers, each having an anode and a cathode comprising current carrying electrodes and a control electrode, said controlled rectifiers having the anode of the first and the cathode of the second directly connected to said first power input terminal;
(b) connection means comprising load means connecting the cathode of the first and the anode of the second to said second alternating current potential power input terminal, said first controlled rectifier being poled so that it may be rendered conductive during the first half cycles of said alternating current potential, said second controlled rectifier being poled so that it may be rendered conductive during the second half cycles of said alternating current potential to provide full wave energization of said load means;
(c) first current control means connected to be energized from said source of alternating current potential on said first half cycles, respectively, said means including current carrying electrodes and a control electrode;
(d) second current control means connected to be energized from said source of alternating current potential on said second half cycles, respectively, said means including current carrying electrodes and a control electrode;
(e) circuit means connecting the control electrodes of said first and second current control means to a signal source;
(f) and signal delay means coupling said first current control means current carrying electrodes to said control electrodes of said second controlled rectifier means in such a manner that when said first current control means is conductive during said first half cycle said delay means is effective to supply a turn-on signal to said second controlled rectifier sufficiently delayed to occur at the leading edge of said second half cycle.

5. Controlled rectifier switching apparatus for controlling the application of electrical power from an electrical source to load means by way of controlled rectifier means, in which the controlled rectifiers, when conductive, are rendered conductive for the entire half cycle, and in which proportional control of the load means is accomplished by the ratio of the number of consecutive cycles in which the controlled rectifiers are conductive as against the number of succeeding cycles in which the controlled rectifiers are nonconductive, comprising:

(a) first and second power input terminals energized from a source of alternating current power;
(b) first and second controlled rectifiers, each having an anode and a cathode comprising current carrying electrodes and having a control electrode, said rectifiers having the anode of each connected to the cathode of the other, the rectifiers thus having their current carrying electrodes connected in parallel one with the other but in polarity opposition;
(c) means comprising said current carrying electrodes of said controlled rectifiers connecting load means to said first and second alternating current power input terminals, said first controlled rectifier being poled so that it may be rendered conductive during the first half cycle of said alternating current power, said second controlled rectifier being poled so that it may be rendered conductive during the second half cycle of said alternating current power;
(d) third and fourth controlled rectifiers each including current carrying electrodes and a control electrode and each connected to be energized by half wave power from said source of alternating current power, said third controlled rectifier being energized on the first half cycles of said alternating source and said fourth controlled rectifier being energized on the second half cycle of said alternating source;
(e) first time delay means coupling said third controlled rectifier current carrying electrodes to said control electrodes of said second controlled rectifier whereby a turn-on signal can be applied;
(f) second time delay means similarly coupling said fourth controlled rectifier current carrying electrodes to said control electrode of said first controlled rectifier;
(g) circuit means connecting the control electrodes of said third and fourth controlled rectifier to a signal input circuit, such that when the signal is sufficient said third controlled rectifier is caused to conduct during said first half cycles, respectively, and the output from said rectifier is coupled and delayed by said first time delay means such that said second controlled rectifier is rendered conductive for the entire second half cycle, likewise the fourth controlled rectifier is caused to conduct during said second half cycles, and the output from said fourth rectifier is coupled and delayed by said second time delay means such that said first controlled rectifier is rendered conductive for the entire first half cycle;
(h) and feedback means having its input terminals connected in parallel with said load means and including energy storage means, said feedback means providing an output signal which increases with time as said load means is energized for a series of cycles and which decreases with time as said load means is de-energized, said feedback means having its output circuit connected to said signal input circuit such that said feedback means output signal opposes and effectively reduces said source of signal potential thereby rendering nonconductive said controlled rectifier means until said output feedback signal decays.

References Cited by the Examiner

UNITED STATES PATENTS 3,058,010  10/1962  Rockafellow _____ 307—88.5
3,204,113  8/1965  Snygg _____ 307—88.5

JOHN F. COUCH, *Primary Examiner.*

W. M. SHOOP, K. D. MOORE, *Assistant Examiners.*